United States Patent Office

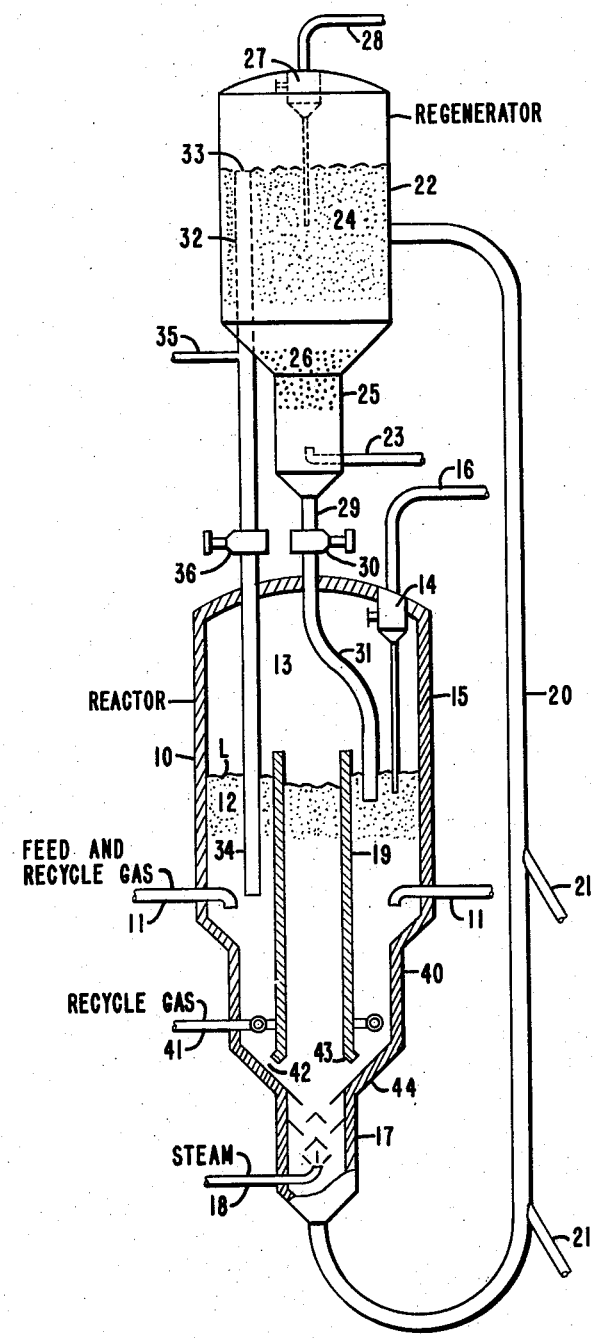
EDWARD W. S. NICHOLSON  INVENTOR

2,894,902
Patented July 14, 1959

2,894,902

FLUID SOLIDS SYSTEM EMPLOYING A MIXTURE OF CATALYST AND INERT PARTICLES

Edward Wheelock Steele Nicholson, Baton Rouge, La., assignor to Esso Research and Engineering Company, a corporation of Delaware Application December 30, 1954, Serial No. 478,709

6 Claims. (Cl. 208—149)

This invention relates to fluid catalytic processes and particularly to fluid catalytic processes in which inert heat transfer solids are circulated in the system in order to facilitate the removal of heat from an exothermic reaction zone or the supply of heat to an endothermic reaction zone or both. In a specific application this invention involves a heat balanced fluid hydroforming process in which catalyst is circulated continuously between a fluidized bed in the reaction zone and a similar fluidized bed in the regeneration zone and inert heat transfer solids or shot are circulated with the catalyst but at a substantially faster rate in order to transfer the heat released in the regeneration zone into the reaction zone.

The fluidized solids technique has been widely adopted for a variety of catalytic reactions especially for the conversion of hydrocarbons as in catalytic cracking, reforming, hydroforming and the like because of the advantages offered thereby of continuity of operation, uniformity of temperatures in the reaction and regeneration zones and the facility with which control of all phases of the process is achieved. An important advantage of the fluid solids technique is the fact that the catalyst can be used as a carrier of heat from the regeneration zone into the reaction zone.

It has been proposed to increase the heat transfer in fluid catalytic processes by circulating inert heat transfer solids or shot through the system along with the catalyst. This expedient is especially useful in fluid hydroforming since selectivity considerations require that low catalyst-to-oil ratios, generally less than 3.5 to 1 and preferably about 1 to 1 be used. Such low catalyst-to-oil ratios limit the amount of heat that can be safely transferred from the regenerator to the reactor and prevent the achievement of a heat-balanced fluid hydroforming process. In order for the addition of shot or heat transfer solids to such a process to be at all practical, it is necessary to minimize the portion of the available reactor space that is occupied by the shot. It is inadvisable, for example, for the shot to occupy more than about 10% of the reactor bed (i.e., about 1 to 10 shot to catalyst ratio); otherwise, the capacity or throughput of the reactor will be unduly reduced. This is particularly important in hydroforming in view of the costs of construction of reactor vessels capable of operating at normal hydroforming pressures of several hundred pounds per square inch. On the other hand, considerably more than 10% of shot is necessary to absorb the heat released in the regenerator; minimum values are of the order of about 3 to 1 and they may be as high as 8 or 10 to 1 shot to catalyst ratio. This is achieved by making the shot of a larger average particle size and of greater density so that it may settle rapidly through the dense fluidized reactor bed, segregating the shot or a mixture of a major proportion of shot and a minor proportion of catalyst and circulating the shot between the reactor and regenerator vessels more rapidly than the catalyst.

The object of this invention is to provide the art with an improved system for the conduct of fluid catalytic processes in which inert, heat transfer solids or shot are circulated with the catalyst.

It is also the object of this invention to provide an improved reactor-regenerator combination which is particularly suited for the conduct of fluid catalytic processes involving the use of circulation of shot.

It is a further object of this invention to provide an improved fluid hydroforming process wherein the catalyst is supplied to the reaction zone in such a way that contact of the freshly regenerated catalyst with hydroformate product vapors is avoided while at the same time providing for adequate time of contact of the shot with the reactor bed to transfer the sensible heat of the shot to the reactor dense bed.

These and other objects will appear more clearly from the detailed specification and claims which follow.

In accordance with the present invention a most effective shot-catalyst fluid reactor system is obtained by locating the regenerator directly above the reactor and providing for the withdrawal of shot and catalyst separately from the regenerator through diplegs or standpipes which extend downwardly into the reactor. The shot dipleg or standpipe terminates near the top of the reactor dense bed thereby maximizing the length of bed traversed by the shot and insuring complete transfer of the heat from the shot to the reactor dense bed. The catalyst dipleg or standpipe terminates near the bottom of the reactor dense bed thereby avoiding appreciable product distribution debits which are incurred when hot, regenerated, unpretreated hydroforming catalyst particles are introduced into a zone of hydroformate product vapors. Control of shot and catalyst flow is accomplished by providing slide valves in the diplegs or standpipes between the regenerator and reactor, thus making possible the use of any catalyst-to-oil ratio desired while heat balance is accomplished by adjustment of the rate of circulation of shot through a separate line.

Reference is made to the accompanying drawing which, diagrammatically, illustrates one embodiment of the present invention.

In the drawing, the reactor vessel 10 is charged with a mixture of finely-divided, fluidizable catalyst particles and inert heat transfer solids or shot. Recycle gas and preheated naphtha feed are supplied to the lower part of the reactor vessel through suitable inlet lines and distribution means 11. While common inlet lines are shown, it will be understood that the recycle gas and feed naphtha may also be introduced separately and through such means as nozzles, rings, etc., in order to obtain uniform distribution of the recycle gas and naphtha feed in the reactor. Gas velocities through the reactor are controlled to form a dense, fluidized bed 12 having a definite level L or interface separating it from a dilute or disperse phase 13 comprising small amounts of catalyst or solid entrained in the vaporous reaction products in the upper part of the reactor vessel. The reaction products pass overhead from the reactor vessel 10 through a cyclone separator 14 or the like for separating entrained catalyst and recycling the same to the reactor dense bed 12 through dipleg 15 attached to the cyclone. Reaction products substantially free from catalyst or other solid particles are removed through product outlet line 16 to suitable product recovery, stabilizing and/or storage equipment.

Suitable catalysts for charging to the system are metal oxides, such as molybdenum oxide, chromium oxide, tungsten oxide, vanadium oxide or the like, or mixtures thereof, preferably, upon an alumina-containing support such as activated alumina, alumina gel, zinc aluminate spinel and the like. Other hydroforming catalysts such as platinum or palladium upon alumina can also be used. Cracking catalysts that can be used include silica-alumina cogels, silica-magnesia, silica-alumina-magnesia, acid activated clays and the like. The catalyst particles should, for proper fluidization, be between 100 and 400 mesh or between about 10 and 200 microns in diameter with a major proportion between about 20 and 100 microns.

The inert, heat transfer solids or shot are preferably coarser and/or of greater density than the catalyst used in the process. Suitable materials include particles of metal such as stainless steel or Monel, corundum, mullite, fused alumina, fused silica or the like. It is necessary that the heat transfer solids have no adverse effect upon the hydroforming process or other catalytic reaction and that they be stable or resistant to physical breakdown due to thermal and mechanical forces to which they are subjected in the process. The size of the heat transfer solids may vary from about 200 to 2000 microns and they are preferably about 500 to 1000 microns in diameter and also are preferably in the shape of spherical or spheroidal particles.

Because of the fact that the shot particles are larger and have a greater density than the catalyst, the shot particles settle downwardly through the reactor dense bed more prapidly than the catalyst. By swaging down the bottom of the reactor vessel to form a settling zone of reduced cross-sectional area as compared with the reactor vessel, it is possible to concentrate the shot in this region and, by proper control of the shot inventory and control of gas velocities through the settling zone, to withdraw from the settling zone a solids stream having a high ratio of shot to catalyst for stripping and circulation to the regeneration zone. Instead of a common withdrawal for shot and catalyst, it is also possible to operate the settling zone in such way as to withdraw substantially pure shot therefrom, in which event, a separate outlet for catalyst is provided near the top of the reactor dense bed so that a separate stream of substantially pure catalyst is withdrawn therefrom. Such arrangement is shown in the regenerator as will be described herein below. If catalyst and shot are withdrawn separately from the reaction zone the two streams are remixed in the desired ratio and circulated to the regenerator at the rate indicated or required by the naphtha feed to the reactor.

In the system shown, a mixture of shot and catalyst in a ratio set by the inventory of shot in the system is withdrawn from the base of reactor 10 into the settling zone 40. Here the ratio of inert solids to catalyst in the descending inert solids-catalyst stream is increased by the action of the recycle gas stream introduced through line 41. The gas quantity and velocity are arranged to control the relative rates of settling of the inert solids and the catalyst particles within zone 40 so that the desired ratio between the inert solids and catalyst will be obtained in the total stream entering stripper 17. The gas velocity is maintained below the minimum fluidizing velocity of the inert solids particles so that essentially no upward movement or mass eddying of inert solids particles occurs. The gas quantity and velocity are then adjusted within the range below the minimum fluidizing velocity of the inert solids particles to properly retard and control the rate of settling of the catalyst particles to give the desired final ratio between the inert solids and the catalyst particles. Some further increase in inert solids-catalyst ratio may occur as the solids mixture passes through the restricted annular space 42 between the flared end 43 of concentric section 19 and the conical section 44 between vessels 40 and 17. This may be caused by the mechanical configuration permitting the heavy inert solids particles to drop to the lower inclined surface of the conical section 44 and move at a relatively higher rate than the average rate through the annular space. There may also be some elutriating action caused by small quantities of steam and stripping gas from stripper 17 passing through annular space 42 into settler 40. The shot-catalyst mixture of the desired ratio of shot to catalyst is introduced into stripper 17 where it is stripped with steam introduced through inlet line 18 to remove adsorbed and occluded hydrogen and hydrocarbons. Steam and stripped materials pass through the concentric section 19 which extends above level L and are released in the disperse phase 13 in the upper part of the reactor. This concentric section 19 serves to by-pass the strpping steam around the dense catalyst bed 12 and thus avoids the deleterious effect this quantity of steam would have on catalyst performance.

The stripped, shot-catalyst mixture is discharged from the bottom of stripper 17 into transfer line 20. Air or other lift gas is introduced into the transfer line 20 through inlets 21 in order to convey the mixture of shot and catalyst upwardly through the transfer line into the regenerator vessel 22. Air is a very convenient lift gas and may serve to initiate the regeneration of the catalyst while it is enroute to the regenerator proper. If air is used as the lift gas, it is preferred that the amount used be only a part of that necessary to regenerate the catalyst. If such an amount of air is not sufficient to lift or carry the shot-catalyst mixture into the regenerator, steam or flue gas can be added in order to increase the volume of gas without increasing the amount of combustion in the transfer line.

The regenerator vessel 22 is swaged down at the bottom, similar to the reactor, to form a settling zone 25 of reduced cross-sectional area compared with the main part of the regenerator vessel. Air, in sufficient amount to complete the regeneration of the catalyst, supplemented, if necessary, with an extraneous gas to provide the desired gas velocities through the regenerator, is supplied through inlet line 23. The gas velocity should be sufficiently high through the regenerator proper in order to maintain a fluid bed therein of sufficiently low viscosity that the shot particles may pass rapidly down through said bed into section 25 forming a bed of shot 26. The gas velocity through the zone of reduced cross-sectional area should be high enough to elutriate finely-divided catalyst away from the shot but not sufficiently high as to fluidize the shot and cause it to back-mix from bed 26 into the main fluid bed 24.

Regeneration gases pass overhead from dense bed 24 and are removed through cyclone separator 27 and outlet line 28 to a suitable flue or stack or to suitable scrubbing and storage equipment in the event that it is desired to use this gas in the process, for example, as stripping or lift gas.

Shot substantially free of catalyst (or containing less than about 10 wt. percent of catalyst) is discharged from the base of section 25 conduit or standpipe 29 and is discharged at a rate controlled by slide valve 30 into conduit 31 and thence into the dense bed 12 in the reactor. Conduit 31 is preferably just long enough to reach the top of dense bed 12 so that the hot shot will traverse substantially the entire depth of bed 12 thereby insuring complete transfer of heat from the shot to the fluid bed 12.

An outlet for catalyst is arranged in regenerator 22 in the form of an overflow conduit 32 having its upper end 33 substantially at the level of the top of the dense bed 24. The catalyst flows downwardly through conduit 32, slide valve 36 and conduit 34 into the reactor dense bed 12. The conduit 34 extends far down into the dense bed 12 so that the hot regenerated catalyst enters the dense bed in a region far removed from that which contains a high percentage of hydroformate product. This is quite important since it has been found that the freshly regenerated catalyst has an adverse effect upon product distribution if contacted with hydroformate vapors as would be the case if the freshly regenerated catalyst were discharged into the top of the dense bed 12, i.e., in the region where it is necessary to discharge the shot to get the desired heat exchange. Stripping gas such as nitrogen may be introduced into conduit 32 through inlet line 35 in order to separate regeneration gases from the regenerated catalyst. Also, if desired a reducing gas, such as hydrogen or hydrogen-containing recycle gas may be introduced into conduit 34 in order to effect a very short-time pretreatment or partial reduction of the catalyst prior to discharge thereof into the reactor dense bed.

The feed or charging stock to the reactor in a hydroforming operation may be a virgin naphtha, a cracked naphtha, a Fischer-Tropsch naphtha, or the like having a boiling range of from about 125°–450° F., or it may be a narrow boiling cut from within this range. The feed stock is preheated alone or in admixture with hydrogen-rich recycle gas to temperatures near reaction temperatures. Recycle gas is circulated through the reaction zone at a rate of from about 500 to 6000 cu. ft. per barrel.

The hydroforming reactor vessel is operated at about 850°–1050° F., preferably, about 900°–950° F., and at pressures of about 50 to 1000, preferably, about 200 lbs. per sq. inch. In the case of molybdenum oxide on alumina catalysts, it is desirable to maintain a water partial pressure of about 0.1 to 3.0 mol percent in the reaction zone.

The regenerator is operated at essentially the same pressure as the hydroforming reactor vessel and at temperatures of about 1000°–1200° F. or low enough to avoid thermal degradation of the catalyst. The average residence time of the catalyst in the reactor is of the order of from about 1 to 4 hours and in the regenerator of from about 3 to 15 minutes. The average residence time of the heat transfer solids or shot in the reaction zone is of the order of from about 3 to 20 minutes, and in the regenerator bed 24 it may be about 2 to 60 seconds.

The weight ratio of catalyst to oil introduced into the reactor should ordinarily be about 0.5 to 3.5. Space velocities or the weight in pounds of feed charged per hour per pound of catalyst in the reactor depends upon the age or activity level of the catalysts, the character of the feed stock and the desired octane number of the product. Space velocity for a molybdic oxide on alumina gel catalyst may vary from about 1.5 to 0.15 w./hr./w.

The invention will be more clearly understood by considering its application to the hydroforming of a 200°–350° F. virgin naphtha having a Research clear octane number of 45 to 50 to yield a product gasoline of 95 to 100 Research clear octane number. A catalyst consisting of about 10% $MoO_3$ on an activated alumina is used, and the inert heat transfer solids are microspheroidal mullite particles of 800–1400 microns diameter. The system pressure is about 200 lbs. per sq. in. The reactor dense bed 12 is held at about 900° F., and the regenerator bed 24 is held at a temperature of about 1125° F.

The catalyst is circualted through the system at a rate of about 0.5 lb./lb. of naphtha fed into the reactor, and the inert solids are circulated at a rate of about 5 lb./lb. of naphtha feed. The ratio of inert solids to catalyst is thus about 10 to 1. The catalyst and inert solids are circulated together at this rate through transfer line 20. Inert solids are separated from catalyst in the regenerator and the two solids are returned separately to the reactor. However, some small amounts of catalyst may be occluded with the inert solids introduced into the reactor through line 31. Hence, the quantity of catalyst introduced into the bottom of the reactor through line 34 is reduced correspondingly. The temperature of the inert solids introduced into the top of the reactor bed through line 31 is essentially the same as the temperature of the regenerator. The temperature of the catalyst at the terminal end of line 34 is reduced somewhat below regeneration temperature by indirect heat transfer during passage through line 34 within dense bed 12. This is an advantage because it reduces the possibility of some catalyst being pretreated at undesirably high tempertures.

The total recycle gas introduced into the reactor amounts to about 3000 cu. ft. per bbl. of naphtha feed. Part or all of this gas is introduced through line 41 to fluidize the solids in the settling section 40 and to control the rate of settling of catalyst in this section. The amount of recycle gas introduced through line 41 is sufficient to provide a velocity in settling section 40 below the minimum fluidizing velocity of the inert solids particles. This may be in the range of 0.8 to 2.0 feet per second. The remainder of the recycle gas is introduced along with the naphtha feed through inlet lines 11. The operation of the lower section of the reactor including the settling zone 40 is very important. If the proper conditions for achieving the necessary ratio of inert solids to catalyst in the stream leaving section 40 are not obtained, undesirably large quantities of inert solids will exist in the bottom of the reactor dense bed 12, thus occupying an undesirably large volume of the reactor which should be used for carrying out the hydroforming reaction.

The mixture of inert solids and catalyst in the proper ratio is introduced into stripping section 17. Here the adsorbed and occluded hydrocarbons and hydrogen associated with the catalyst and inert solids are removed by stripping with steam introduced through line 18. This section is preferably baffled to insure thorough contact of the solids with steam. The quantity of steam used is held to the minimum necessary for satisfactory removal of hydrocarbons and hydrogen from the solids in order to minimize the possibility of appreciable quantities of steam entering the main reactor dense bed 12. Essentially all the steam and the vapors stripped from the solids pass through the interior of concentric section 19 and into the disperse phase 13, thus bypassing the main reactor bed 12. The quantity of stripping steam used is about 1.5 lbs./1000 lbs. of total solids passing down through stripper 17.

The mixture of catalyst and inert solids is withdrawn from the bottom of stripper 17 and passed through U-bend and transfer line 20 to regenerator 22. The solids are moved through this line 20 by introducing air through lines 21 to provide the proper velocity and density in the riser section of line 20. The velocity in this line should be in the range of 10 to 30 ft. per second and the density about 30 to 15 lbs. per cu. ft. Only 10–30% of the air necessary for combustion of carbon in the regenerator should be introduced through lines 21; the remainder is introduced through line 23. If additional gas is necessary for transportation of the solids through line 20, recycled regenerator flue gas or other inert gas may be used in addition to the air added through lines 21.

The inert heat transfer solids in the circulating stream entering the regenerator from line 20 drop rapidly through the dense bed 24 to the settling section 25 forming a non-fluidized bed of essentially pure inert solids 26. Air introduced through line 23 at the bottom of the settling section serves to elutriate catalyst particles from this inert solids bed 26 and returns them to the catalyst bed 24. The inert solids bed 26 also serves to distribute the air introduced through line 23 so that a stable, non-turbulent, well fluidized area exists in the bottom part of the regenerator for most efficient separation of inert solids from catalyst. The velocity of the gases rising through the lower section of the regenerator is in the range of 0.3 to 1 ft. per second. The settling section 25 also serves as a reservoir for inert solids. The upper level of the inert solids bed 26 will rise or fall as minor changes are made to the circulation rate of inert solids through the system. The total inventory of inert solids in the system can be adjusted to take care of major changes in inert solids circulation rate. The velocity of the air rising through bed 26 is maintained below the minimum settling velocity of the inert solids particles, preferably, about 40–80% of the minimum settling velocity. This is generally in the range of 1.0 to 2.5 ft. per second.

The foregoing description contains a limited number of embodiments of the present invention. It will be understood, however, that the invention is not limited

What is claimed is:

1. In a fluid catalytic process in which shot particles are circulated with catalyst to facilitate heat transfer, the improvement which comprises maintaining a dense, fluidized bed of a major proportion of catalyst particles and a minor proportion of shot in the hydrocarbon conversion zone through which the shot particles settle more rapidly than the catalyst, continuously withdrawing shot and catalyst from the reaction zone, the amount of shot withdrawn being substantially greater than the amount of catalyst, passing the withdrawn shot and catalyst to a regeneration or heating zone, maintaining a dense, fluidized bed of catalyst and shot in the latter zone by the passage of oxygen-containing regeneration gas therethrough, withdrawing a stream consisting essentially of shot from the bottom of the regeneration zone and passing it substantially vertically downward into the hydrocarbon conversion zone and discharging the shot into the top portion of the dense fluidized bed in the hydrocarbon conversion zone, withdrawing a stream consisting essentially of regenerated catalyst from the upper part of the dense fluid bed in the regeneration zone, passing the stream of regenerated catalyst substantially vertically downward into the hydrocarbon conversion zone and discharging the freshly regenerated catalyst into the bottom portion of the dense fluidized bed in the hydrocarbon conversion zone.

2. In a fluid catalytic process in which shot particles are circulated with catalyst to facilitate heat transfer, the improvement which comprises maintaining a dense, fluidized bed of a major proportion of catalyst particles and a minor proportion of shot in the hydrocarbon conversion zone through which the shot particles settle more rapidly than the catalyst, segregating a mixture comprising a major proportion of shot and a minor proportion of catalyst in a settling zone at the bottom of the hydrocarbon conversion zone, withdrawing said mixture from the settling zone, passing the withdrawn shot and catalyst to a regeneration or heating zone, maintaining a dense, fluidized bed of catalyst and shot in the latter zone by the passage of oxygen-containing regeneration gas therethrough, withdrawing a stream consisting essentially of shot from the bottom of the regeneration zone and passing it substantially vertically downward into the hydrocarbon conversion zone and discharging the shot into the top portion of the dense fluidized bed in the hydrocarbon conversion zone, withdrawing a stream consisting essentially of regenerated catalyst from the upper part of the dense fluid bed in the regeneration zone, passing the stream of regenerated catalyst substantially vertically downward into the hydrocarbon conversion zone and discharging the freshly regenerated catalyst into the bottom portion of the dense fluidized bed in the hydrocarbon conversion zone.

3. In a fluid catalytic process in which shot particles are circulated with catalyst to facilitate heat transfer, the improvement which comprises maintaining a dense, fluidized bed of a major proportion of catalyst particles and a minor proportion of shot in the hydrocarbon conversion zone through which the shot particles settle more rapidly than the catalyst, segregating substantially pure shot in a settling zone at the bottom of the hydrocarbon conversion zone, withdrawing substantially pure shot from said settling zone, withdrawing substantially pure catalyst from the dense fluidized bed in the conversion zone, mixing a major proportion of shot with a minor proportion of catalyst, passing the resultant mixture of shot and catalyst to a regeneration or heating zone, maintaining a dense, fluidized bed of catalyst and shot in the latter zone by the passage of oxygen-containing regeneration gas therethrough, withdrawing a stream consisting essentially of shot from the bottom of the regeneration zone and passing it substantially vertically downward into the hydrocarbon conversion zone and discharging the shot into the top portion of the dense fluidized bed in the hydrocarbon conversion zone, withdrawing a stream consisting essentially of regenerated catalyst from the upper part of the dense fluid bed in the regeneration zone, passing the stream of regenerated catalyst substantially vertically downward into the hydrocarbon conversion zone and discharging the freshly regenerated catalyst into the bottom portion of the dense fluidized bed in the hydrocarbon conversion zone.

4. A method of hydroforming hydrocarbon fractions which comprises passing vapors of hydrocarbon fractions boiling in the naphtha range and hydrogen-rich gas through a dense fluidized bed comprising a major proportion of hydroforming catalyst particles and a minor proportion of inert heat transfer solids or shot in a main reaction zone maintained at active hydroforming reaction conditions of temperature and pressure and through which the heat transfer solids or shot pass more rapidly than the catalyst, continuously withdrawing shot and catalyst from the hydroforming reaction zone, the amount of shot withdrawn being substantially greater than the amount of catalyst, passing the withdrawn shot and catalyst to a regeneration or heating zone, maintaining a dense, fluidized bed of shot and catalyst in said latter zone by the passage of oxygen-containing regeneration gas therethrough, segregating essentially pure shot at the bottom of the regeneration zone, withdrawing a stream consisting essentially of shot from the bottom of the regeneration zone and passing it substantially vertically downward into the hydroforming reaction zone and discharging the shot into the upper part of the dense fluidized bed in the hydroforming reaction zone, withdrawing a stream consisting essentially of regenerated catalyst from the upper part of the dense fluidized bed in the regeneration zone, passing the regenerated catalyst substantially vertically downward as a confined stream into the hydroforming reaction zone and discharging the freshly regenerated catalyst into the lower part of the dense fluidized bed in the hydroforming reaction zone.

5. A method of hydroforming hydrocarbon fractions which comprises passing vapors of hydrocarbon fractions boiling in the naphtha range and hydrogen-rich gas through a dense fluidized bed comprising a major proportion of hydroforming catalyst particles and a minor proportion of inert heat transfer solids or shot in a main reaction zone maintained at active hydroforming reaction conditions of temperature and pressure and through which the heat transfer solids or shot pass more rapidly than the catalyst, segregating a mixture comprising a major proportion of shot and a minor proportion of catalyst in a settling zone at the bottom of the hydrocarbon conversion zone, withdrawing said mixture from the settling zone, passing the withdrawn shot and catalyst to a regeneration or heating zone, maintaining a dense, fluidized bed of shot and catalyst in said latter zone by the passage of oxygen-containing regeneration gas therethrough, segregating essentially pure shot at the bottom of the regeneration zone, withdrawing a stream consisting essentially of shot from the bottom of the regeneration zone and passing it substantially vertically downward into the hydroforming reaction zone and discharging the shot into the upper part of the dense fluidized bed in the hydroforming reaction zone, withdrawing a stream consisting essentially of regenerated catalyst from the upper part of the dense fluidized bed in the regeneration zone, passing the regenerated catalyst substantially vertically downward as a confined stream into the hydroforming reaction zone and discharging the freshly regenerated catalyst into the lower part of the dense fluidized bed in the hydroforming reaction zone.

6. A method of hydroforming hydrocarbon fractions which comprises passing vapors of hydrocarbon fractions boiling in the naphtha range and hydrogen-rich gas through a dense fluidized bed comprising a major proportion of hydroforming catalyst particles and a minor proportion of inert heat transfer solids or shot in a main reaction zone maintained at active hydroforming reaction conditions of temperature and pressure and through which the heat transfer solids or shot pass more rapidly than the catalyst, segregating substantially pure shot in a settling zone at the bottom of the hydrocarbon conversion zone, withdrawing substantially pure shot from said settling zone, withdrawing substantially pure catalyst from the dense fluidized bed in the conversion zone, mixing a major proportion of shot with a minor proportion of catalyst, passing the resultant mixture of shot and catalyst to a regeneration or heating zone, maintaining a dense, fluidized bed of shot and catalyst in said latter zone by the passage of oxygen-containing regeneration gas therethrough, segregating essentially pure shot at the bottom of the regeneration zone, withdrawing a stream consisting essentially of shot from the bottom of the regeneration zone and passing it substantially vertically downward into the hydroforming reaction zone and discharging the shot into the upper part of the dense fluidized bed in the hydroforming reaction zone, withdrawing a stream consisting essentially of regenerated catalyst from the upper part of the dense fluidized bed in the regeneration zone, passing the regenerated catalyst substantially vertically downward as a confined stream into the hydroforming reaction zone and discharging the freshly regenerated catalyst into the lower part of the dense fluidized bed in the hydroforming reaction zone.

References Cited in the file of this patent

UNITED STATES PATENTS

| | | |
|---|---|---|
| 2,393,636 | Johnson | Jan. 29, 1946 |
| 2,446,247 | Scheineman | Aug. 3, 1948 |
| 2,655,465 | Martin | Oct. 13, 1953 |
| 2,725,341 | Goronowski et al. | Nov. 29, 1955 |
| 2,763,595 | Fritz | Sept. 18, 1956 |